United States Patent Office 3,663,716
Patented May 16, 1972

3,663,716
METHOD OF TREATING ACNE WITH BENZYL ALCOHOL
Morris Emmanuel Stolar, Trumbull, Conn., assignor to Miles Laboratories, Inc., Elkhart, Ind.
No Drawing. Filed June 22, 1970, Ser. No. 48,454
Int. Cl. A61k 27/00
U.S. Cl. 424—343     4 Claims

ABSTRACT OF THE DISCLOSURE

Benzyl alcohol preferably in the form of an aqueous solution or ointment has been found to be effective in the treatment of acne when applied topically to the affected areas of the human body.

BACKGROUND OF THE INVENTION

Acne is a common inflammatory disease of the sebaceous glands in which the sebaceous duct ruptures and the sebum or fat secretion spills into the skin instead of coming to the surface. The sebum contains fatty acids formed by the action of bacterial lipases which irritate the tissue usually on the face, back and chest of over 80% of teen-agers. Soon cysts develop which if not properly treated with antibiotics or sulfonamides result in atrophy and ugly scarring. No completely satisfactory method of treatment is known although antibiotics significantly reduce the fatty acid content of sebum. Thus, an agent exhibiting anti-lipolytic activity was sought which would be effective in treating the causative factor of acne.

SUMMARY OF THE INVENTION

The present invention is based upon the discovery that benzyl alcohol is extremely effective in inhibiting the formation of free fatty acids and is an improved agent for the treatment of acne when applied topically either alone, as a dilute aqueous solution or in combination with non-toxic, pharmaceutical, liquid or solid carriers in the form of an ointment, cream or lotion.

DESCRIPTION OF THE PREFERRED EMBODIMENTS

Benzyl alcohol is a colorless liquid with a faint aromatic odor which has been employed topically in the past as an antiseptic in the form of a 3% aqueous solution and as an anti-pruritic in the form of a 10% ointment or 33% lotion. However, its use in any form for the treatment of acne has never been reported heretofor.

Broadly described, pharmaceutically acceptable formulations of benzyl alcohol can be prepared by incorporating the primary active ingredient with any supplementary active ingredients such as antibiotics or sulfonylureas into the selected liquid or solid pharmaceutical carrier utilizing techniques well known in the art. More specifically, benzyl alcohol in an amount from 1% to 50% by weight and preferably from 2% to 4% by weight can be mixed with water, vegetable oils, propylene glycol and the like to form a solution, suspension or emulsion. If desired, stabilizing agents, wetting or emulsifying agents, buffers or salts can be added. Benzyl alcohol can likewise be formulated with solid carriers such as petrolatum, wax, glyceryl monostearate or spermaceti to form ointment, creams and lotions containing from 1% to 50% by weight of active ingredient but preferably from 10% to 33% by weight. Both liquid and solid compositions are applied liberally one to three times daily to the affected skin areas with frequency being reduced as improvement is noted. As previously stated, benzyl alcohol per se without dilution can also be applied topically if desired to treat acne.

The effectiveness of benzyl alcohol in inhibiting the formation of free fatty acids was demonstrated by applying to one half of the forehead of normal humans a composition containing benzyl alcohol while the other half was treated with a control such as water or isopropanol. At specified time intervals, sebum was collected with an absorbent paper and subsequently extracted with ether. The ether was evaporated, the residual sebum weighed accurately and assayed for free fatty acids either titrimetrically, gravimetrically or by gas chromatography.

In one test, a 1% aqueous solution of benzyl alcohol was applied to one half of the forehead and compared with distilled water as a control. After 1.5 hours, the fatty acid content of the sebum collected from the area treated with benzyl alcohol was reduced from 7.3 to 6.6 milliequivalents per milligram of sebum whereas the water treated area showed an increase of from 7.3 to 9.6 milliequivalents of fatty acid per milligram of sebum.

In another test, a medicated cleanser containing 1% hexachlorophene, 2% colloidal sulfur and 2% salicyclic acid in an emulsion creme buffered to a pH of 4.2 was used as a control and compared to the same cleanser to which was added 2% by weight of benzyl alcohol. Sebum was collected for six hours and weighed. In 3 out of 4 patients, the amount of sebum secreted was reduced by 20 to 28% in the area treated with the benzyl alcohol containing cleanser versus the area treated with the cleanser alone. The fatty acid content of the sebum from the area treated with the cleanser containing 2% benzyl alcohol was likewise significantly lower than in the sebum collected from the area treated with the cleanser only.

In still another test, the foreheads of five patients were treated with a 4% aqueous benzyl alcohol solution and the amount of sebum secreted was compared over a period of 14 days with that collected from foreheads of five patients treated with a 4% aqueous isopropanol solution. Significant reductions of from 23% to 74% in the quantity of sebum secreted resulted in the patients treated with benzyl alcohol whereas the control group treated with isopropanol showed reductions of sebum secreted ranging from 0% to 25%.

Similar results are obtained when compositions containing concentrations on the order of from 10 to 50% by weight of benzyl alcohol are used in treating acne. Since the active ingredient is virtually non-toxic, 100% benzyl alcohol can be employed if desired to obtain the same beneficial reductions in sebum secretion and inhibition of fatty acid formation which is the underlying cause of acne.

What is claimed is:

1. A method for treating acne which comprises topically applying a composition comprising about from 1% to 50% by weight of benzyl alcohol in a pharmaceutically acceptable carrier to the skin areas so affected.
2. A method as in claim 1 in which an aqueous solution containing from 2 to 4% by weight of benzyl alcohol is applied topically.
3. A method as in claim 1 in which an ointment containing from 1 to 50% by weight of benzyl alcohol is applied topically.
4. A method as in claim 1 in which an ointment containing from 10 to 33% by weight of benzyl alcohol is applied topically.

References Cited

Conn-Current Therapy (1952) Saunders Co. Philadelphia, Pa. p. 510.
Hodgson, J. Soc. Cos. Chem. vol. 17 (1966) p. 29.
U.S. Dispensatory, 25th Ed. (1955), pp. 158 and 159.

SAM ROSEN, Primary Examiner